(12) United States Patent
Procopio et al.

(10) Patent No.: US 8,751,493 B2
(45) Date of Patent: Jun. 10, 2014

(54) ASSOCIATING A FILE TYPE WITH AN APPLICATION IN A NETWORK STORAGE SERVICE

(75) Inventors: Michael Jeffrey Procopio, Boulder, CO (US); Adam Wayne Besen, Lyons, CO (US); Robert Eugene Wyrick, Firestone, CO (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/453,176

(22) Filed: Apr. 23, 2012

(65) Prior Publication Data

US 2013/0282755 A1    Oct. 24, 2013

(51) Int. Cl.
*G06F 7/00* (2006.01)
*G06F 17/30* (2006.01)

(52) U.S. Cl.
USPC ............ 707/736; 707/770; 709/203; 709/229

(58) Field of Classification Search
USPC .......................... 707/736, 770; 709/203, 229
See application file for complete search history.

(56) References Cited

U.S. PATENT DOCUMENTS

| | | | |
|---|---|---|---|
| 7,263,688 B2 * | 8/2007 | Pitzel et al. ................... | 717/121 |
| 7,707,413 B2 | 4/2010 | Lunt et al. | |
| 7,734,914 B1 | 6/2010 | Malasky | |
| 7,779,113 B1 | 8/2010 | Samar | |
| 8,250,455 B2 | 8/2012 | Kadowaki et al. | |
| 8,341,708 B1 | 12/2012 | Eatough et al. | |
| 8,364,759 B2 * | 1/2013 | Moromisato et al. ......... | 709/204 |
| 8,478,817 B2 * | 7/2013 | Duggal ......................... | 709/203 |
| 2005/0243760 A1 | 11/2005 | Yoshioka | |
| 2005/0289538 A1 | 12/2005 | Black-Ziegelbein et al. | |
| 2006/0005168 A1 | 1/2006 | Singh | |
| 2006/0070029 A1 | 3/2006 | Laborczfalvi et al. | |
| 2006/0074837 A1 * | 4/2006 | Braddy et al. .................... | 707/1 |
| 2007/0254631 A1 | 11/2007 | Spooner | |
| 2008/0172720 A1 | 7/2008 | Botz et al. | |
| 2008/0189361 A1 * | 8/2008 | Greschler et al. ............. | 709/203 |
| 2009/0083707 A1 | 3/2009 | Fujita et al. | |
| 2009/0210721 A1 | 8/2009 | Phillips | |
| 2009/0235352 A1 | 9/2009 | Schrijen et al. | |

(Continued)

FOREIGN PATENT DOCUMENTS

| | | |
|---|---|---|
| KR | 10-2010-0137323 | 12/2010 |
| KR | 10-2012-0010397 | 2/2012 |

OTHER PUBLICATIONS

International Search Report for PCT/US2013/037701 dated Jun. 26, 2013.

(Continued)

*Primary Examiner* — Hares Jami
(74) *Attorney, Agent, or Firm* — Ropes & Gray LLP (57) ABSTRACT

Techniques are described for associating file types with application in a network storage service. User environment manager at storage service receives file identifier for specific requested file from user operating computing device and obtains file format type identifier associated with file identifier from data store for file. User environment manager determines default application to open specific requested file in response to matching application ID (app ID) from default "Open with" list contained in user preferences store with list of app IDs for installed applications that support file format type. Once determined, user environment manager opens specific requested file from data store utilizing the default application. This Abstract is submitted with the understanding that it will not be used to interpret or limit the scope or meaning of the claims.

14 Claims, 5 Drawing Sheets

(56) References Cited

U.S. PATENT DOCUMENTS

| | | |
|---|---|---|
| 2009/0254580 A1 | 10/2009 | Laurion |
| 2009/0288135 A1 | 11/2009 | Chang et al. |
| 2010/0005529 A1 | 1/2010 | Hemade |
| 2010/0161762 A1 | 6/2010 | Saxena |
| 2010/0257578 A1 | 10/2010 | Shukla et al. |
| 2010/0274910 A1* | 10/2010 | Ghanaie-Sichanie et al. ............. 709/229 |
| 2010/0281528 A1* | 11/2010 | Hayton et al. ............. 726/7 |
| 2011/0066668 A1 | 3/2011 | Guarraci |
| 2011/0137979 A1 | 6/2011 | Seo et al. |
| 2011/0202672 A1 | 8/2011 | Narayanaswamy et al. |
| 2011/0231912 A1 | 9/2011 | Lee et al. |
| 2011/0252038 A1* | 10/2011 | Schmidt et al. ............. 707/741 |
| 2012/0005159 A1 | 1/2012 | Wang et al. |
| 2012/0095878 A1* | 4/2012 | Feldman et al. ............. 705/27.1 |
| 2012/0099135 A1 | 4/2012 | Ono |
| 2012/0110646 A1 | 5/2012 | Ajitomi et al. |
| 2012/0144202 A1 | 6/2012 | Counterman |
| 2012/0144454 A1 | 6/2012 | Lee |
| 2012/0254042 A1 | 10/2012 | Ludmann |
| 2012/0266229 A1 | 10/2012 | Simone et al. |
| 2013/0036455 A1 | 2/2013 | Bodi et al. |
| 2013/0086670 A1 | 4/2013 | Vangpat et al. |
| 2013/0111336 A1* | 5/2013 | Dorman et al. ............. 715/255 |
| 2013/0124606 A1* | 5/2013 | Carpenter et al. ............. 709/203 |

OTHER PUBLICATIONS

Beresford et al., "MockDroid: Trading Privacy for Application Functionality on Smartphones," HotMobile '11 Mar. 1-3, 2011, Phoenix, AZ, USA.

Nauman et al., "Apex: Extending Android Permission Model and Enforcement with User-Defined Runtime Constraints," ASIA CCS '10 Apr. 13-16, 2010 Beijing, China.

The Oauth 2.0 Authorization Protocol; draft letf-oauth-v2-24; Mar. 8, 2012.

Zhou et al., "Taming Information-Stealing Smartphone Applications (on Android)," LNCS 6740:93-107 (2011).

* cited by examiner

ASSOCIATING A FILE TYPE WITH AN APPLICATION IN A NETWORK STORAGE SERVICE

BACKGROUND

A file format is used to specify how to convert the data contained in the file, typically binary data in 1s and 0s, to information useful to humans. One method of identifying the type of a file is to store information regarding the format in the file itself. Such information is placed in specific locations within the file, such as in metadata contained in a file header at the beginning of the file or elsewhere in the file. The headers, including file type information, can be human readable or binary.

In some document and file management systems, files or items in the system may be associated with standardized, generic typing information, for example, a "MIME type." Multipurpose Internet Mail Extensions (MIME) is an Internet Engineering Task Force (IETF) standard that describes a mechanism for specifying binary file encodings in a standardized way. MIME types were originally used to identify what type of file was attached to an email, independent of the operating system of the sender and recipient. File name extensions (e.g., ".txt" for plain text) is another way to specify the format of a file.

SUMMARY

Techniques are described for associating a file type with an application in a network storage service. A user environment manager at the storage service receives a file identifier for a specific requested file from a user operating a computing device and obtains a file format type identifier associated with the file identifier from a data store for the file. The user environment manager determines a default application to open the specific requested file in response to matching an application ID (app ID) from a default open with list contained in a user preferences store with a list of app IDs for installed applications that support the file format type. Once determined, the user environment manager opens the specific requested file from the data store utilizing the default application. In some implementations, the user environment manager presents a list of applications capable of opening a requested file.

In some implementations, a third-party application and registration information are received. The application is mapped to file types, such as MIME types (or other file type information stored in the files themselves). The application is made available to users to install. In response to an "Open" request, a file is opened with a user default application if a user default application is selected. The file is opened with a system default application if no user default application is selected. In response to an "Open with" request, a user is presented with a list of installed third-party and system applications. A file is opened with an application is selected from the list.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The availability of cloud storage has greatly expanded. Cloud storage is a form of network storage which is available via the Internet. As used herein, network storage may include, for example, storage available via a network that may or may not comprise the Internet or be connected to the Internet. Data stored in the network storage may take the form of database content, user files, or other data content generally shared over a network. Hosting of the network storage typically occurs in large data centers and customers lease or use such network storage. The data center operators, in the background, virtualize the resources according to the requirements of the customer and expose them as storage pools, which the customers can themselves use to store files or data objects. Physically, the resource may span across multiple servers at multiple locations and may be replicated in various data centers proximate to the customers or their end users. These cloud storage services may be accessed through a web service application programming interface (API), or through a Web-based user interface.

A subset of this cloud or network storage is personal storage. Storage services provide an easy and convenient way to save any sort of files, including documents, photos and music files, on a network with a network-based storage service. The files are stored on the network where they are accessible substantially anywhere there is a network connection (e.g., an Internet connection in the case of cloud storage). If an original file is ever damaged or lost from a user's local hard drive, the file can be easily restored by the storage service. Some storage services also allow users to share files with others, typically through a link to a folder with the files are to be shared or through a direct link to the file.

Files typically can be accessed from a variety of types of computing devices, including, for example: computer workstations, mobile phones, video game consoles, laptops, tablet computers, or any other device that can access the Internet. Some network storage services are accessed through a web browser interface and others have proprietary interfaces that provide features designed to make uploading, accessing and sharing files more intuitive while also providing access to administrative functions like scheduling backups or creating sub-accounts for users.

For these file or data sharing services (i.e., cloud storage, and personal network storage), one problem is how to store a file. One way to store a file is to write the file to a persistent (e.g., electro or electro-mechanical) storage device in a binary encoding format. A file format is used to specify how to interpret the data contained in the binary file. In other words, the file format is used to specify how to make binary data in 1s and 0s into information useful to humans. At least three implementations of determining how to interpret a file are described herein. One method of identifying the type of a file is to store information regarding the format in the file itself. Such information is placed in specific locations within the file, such as in metadata contained in a file header. The term header does not necessary mean at the beginning of the file. A file header can be elsewhere in the file. The header, including file type information, can be human readable or binary. In an alternative implementation, file metadata including information regarding file format is not stored in the file itself but in a separate database.

MIME is just one standard, of multiple possible standards, that specifies how to identify file types. MIME, Multipurpose Internet Mail Extensions, also know as Internet media type, is an Internet Engineering Task Force (IETF) standard that describes a mechanism for specifying binary file encodings in a standardized way. Aspects of MIME are described in several IETF standards documents such as RFC2045, RFC2046, RFC4288, and others. For MIME, the string that describes a binary file type is usually referred to as a "MIME type." For binary files, a well-defined encoding schema is used that determines how the binary data in the file should be interpreted. For example, an image encoding standard known as JPEG describes a mapping between the binary data in an image file and a visual rendering of that image. The MIME type for JPEG is image/jpeg. Several other MIME types exists for common, standardized file types such as a music file type known as MPEG Audio Layer III or MP3, a music file type known as MPEG-4 Part 14 or MP4, an image file type known as Graphics Interchange Format or GIF, a graphics file type known as portable network graphics or PNG, an image file type known as tagged image file format or TIFF, plain text, a file in a format known as hypertext markup language or HTML, a file in a format known as extensible markup language or XML, a file format known as portable document format or PDF, etc.

Some cloud or network storage systems provide applications to allow users, using only a web browser, to interact with documents stored on the network storage, without needing to have a full version of a software program installed on their local machine. As used herein, an "application" may include a software program that integrates with the storage system via APIs, or Application Programming Interfaces. For example, some network storage services allow documents to be opened and edited using a word processor provided by the network storage service. A user does not need to own or install a conventional full version of the word processor on his or her hard drive, but instead can edit files using only his or her browser.

While such applications are typically provided by the network storage service itself, various implementations described herein enable third-party developers to integrate their applications with a storage service or to allow their applications to be used with a network storage service. As used herein, a "third-party developer" may include a developer or supplier of software that is not the same as the owner or operator of the storage service.

Thus, a technical problem for these file or data network storage services is how to manage which software applications are able to open or create files/data of different file types stored with the service. Such software applications may be able to open, preview, view, edit, render, or process certain items in the system. Such capacity may be determined based on a matching or a correspondence of a particular item's associated file type, and the presence of the associated file type in a list of one or more file types (e.g., MIME or other file type identification system) associated with the software application. Such a match may indicate that the software application may be used to open, preview, render, or process any file with the matching type. It is generally desirable, for security reasons, to impede third-party application providers from accessing user files of types that their application is not meant to handle.

Third-Party Applications

In a storage service, which can be a file or data storage or sharing service or system, for a given file type, there may be multiple software applications capable of opening files of that type. Such software applications may include, for example, a combination of applications authored by or provided by the storage service proprietor or operator, by third parties, or both. The applications may include a "universal default" software application, which is always installed, and is capable of opening or previewing, with some basic level of functionality, files of all types in the file or data sharing service system. Consider, for example, a portable network graphics or PNG image file. The system application is capable of previewing this file. However, third-party applications could allow for a richer preview experience. Some could even allow for an editing experience.

Figure 1:
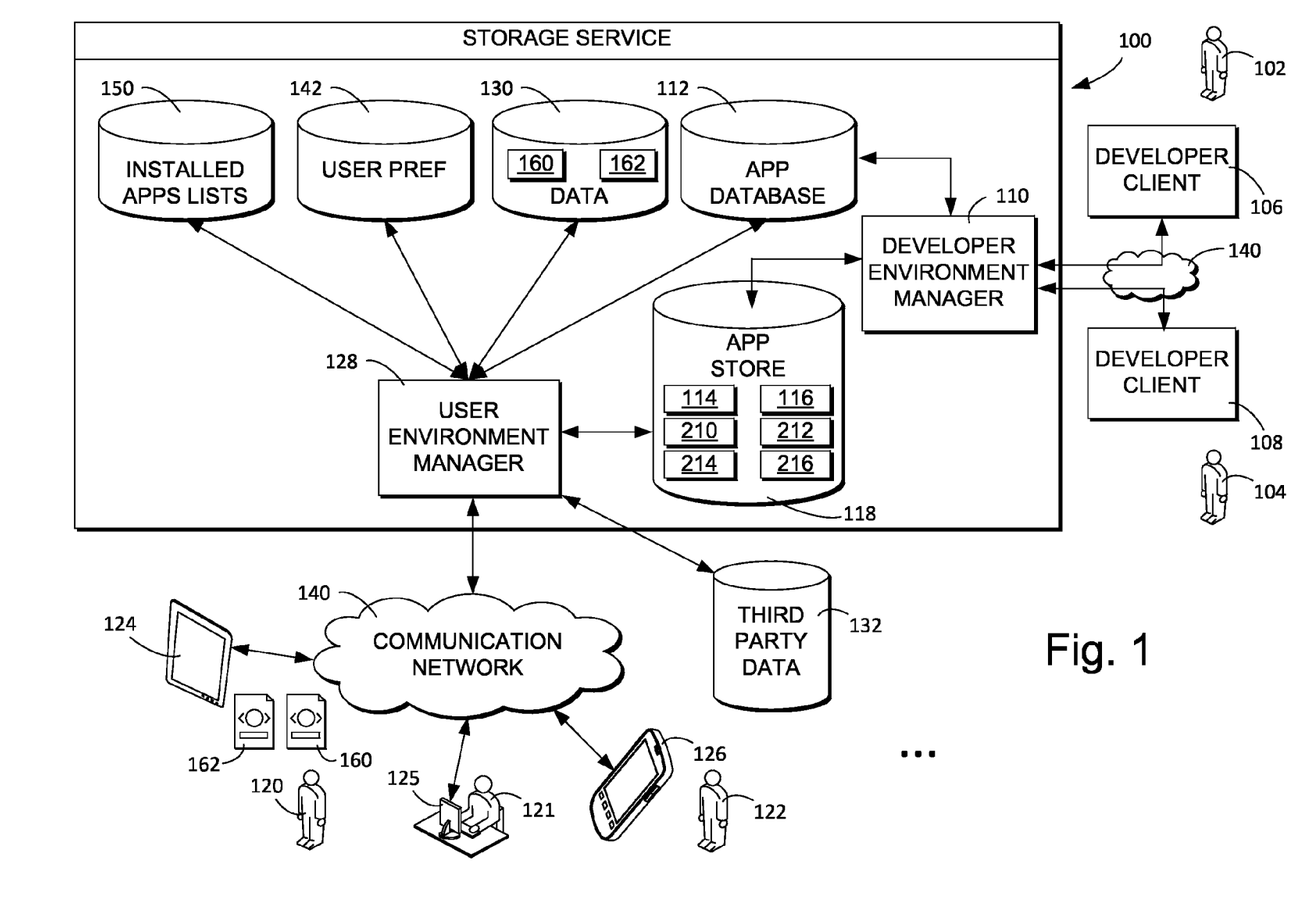
FIG. 1 is a schematic diagram of a system for associating a file type with an application.

FIG. 1 illustrates an example network storage service 100 that may implement the described techniques for associating a file type with an application. The storage service 100 allows a third-party developer to supply web-based software applications for use by users of the storage service.

The applications are generally capable of opening, processing, viewing, or editing files of one or more file types. Third-party developers 102, 104, using client devices 106, 108 are able to integrate or register their applications into the storage service 100 using an interface provided for such integration and supplied by developer environment manager 110 of service 100. Registration or integration includes supplying configuration information to the service 100, such as into a third-party application database 112 maintained by or accessible by the service 100. The configuration information includes, for example, a list of file types that the application is intended to open. Thus, when a developer registers a third-party application, they also register a list of file types that the application can operate on. The developer does this, in some implementations, by registering MIME types, file extensions, or both. These are application-to-MIME type (or file type) mappings, typically a one-to-many relationship.

Some third-party applications can operate on multiple file types or MIME types. For example, a photo editor might be able to operate on image/jpeg, image/png, or other file types. On the other hand, perhaps a third-party project management application could operate only on files which are associated with a custom file extension and MIME type. Such files may be, for example, files made with or for the third-party application.

Every third-party application typically receives its own file type or MIME type associated with its native file format. In some implementations, third-party developers register both MIME types and file extensions that their applications can handle. Similarly, documents or files created with one of these third-party applications can have the file type or MIME type of the application used to create the file. In addition to default file types of MIME types, third-party applications may allow export to any of a variety of file types or MIME types. This could be useful if a user 120, 121, or 122 wishes to use a file with a different type of application.

The developers 102, 104 also upload their applications 114, 116 to an application store 118, using their client devices 106, 108, such as via the developer environment manager 110. The application store 118 may be hosted by, managed by, or controlled by the service 100 or may be independent. As used herein, the term "application store" may include, for example, a database as well as an interface providing a marketplace or storefront to users. The applications 114 and 116 may subsequently be advertised or otherwise made available to and used by users. Applications may be free or paid.

System Overview

Users 120, 121, 122, etc. may discover or learn about the existence of an application 114 or 116 through various discovery channels such as the application store 118, advertising, developer website, or a reference from another user. A user 120, 121, or 122 installs an application 114 on his or her device 124, 125, or 126 through a mechanism intended for such purpose, such as via user environment manager 128, integrating the application into the user's view of the service 100.

Installing an application is not to be confused with typical installation of software in which multiple files are copied to a user's hard drive or solid state drive and reside there until the software is uninstalled. Instead, an installed application is registered to a database that associates users with installed (registered) applications. A list of installed or registered applications is visible to a user when they use the service 100.

The act of "installing" the third-party application constitutes registering a relationship between a user and the third-party application, and acts as a step toward allowing the third-party application to access the user's resources on the service 100.

For example, the installed application 114 may be controlled by a user's browser or other user interface, may be a temporary script or applet run by a user's browser (e.g., on Javan™ or another platform-independent virtual machine), may be a plug-in to a user's browser, may be on a remote computer and remote controlled by a user's client machine 124, 125, 126, or otherwise accessed or controlled.

The application 114 is then available for the user to use to open files of applicable types in the service 100. Users 120, 121, and 122 will typically control, possess, or have access to files in data storage 130 in the service 100 or 132 outside the service 100 and are able to access such files using their respective client devices 124, 125, and 126 via a communication network 140, such as the Internet or other network. Files in the data storage 130 have file types such as MIME types or extensions or both.

In some implementations, the service 100 uses one or more of at least three ways to determine how to interpret a file:
1. Information in the header. In this implementation, the service looks into the file's contents to locate the header, parse it, and compare its structure and format to a database of known formats. For example, executable or .exe files start with a special code indicating their executability.
2. File extension, a property of the name of a file.
3. MIME type, part of accompanying external metadata not directly part of the file's contents (unless appearing in the header) and not part of the file name.

Client devices 124, 125, and 126 can be workstations, laptop computers, notebook computers, personal digital assistants, tablet computers, mobile phones, smart TVs, smart DVD or other media players, smart appliances, or other types of devices having human usable input and output interfaces, which are capable of being networked, and capable of opening files.

The service 100 may also store user preferences in a user preference store or database 142. The service 100 may also maintain a list of installed applications for respective users 120, 121, 122 in installed applications lists 150. Installed applications for multiple users are typically maintained in the application store 118, if the store 118 is maintained by the service 100. Alternatively, applications may be kept by the service 100. Alternatively, applications may be kept outside the service 100, or a combination of both inside and outside. Instances of applications are deployed to users 120, 121, 122 from or by the service 100.

User Interface

Figure 2:
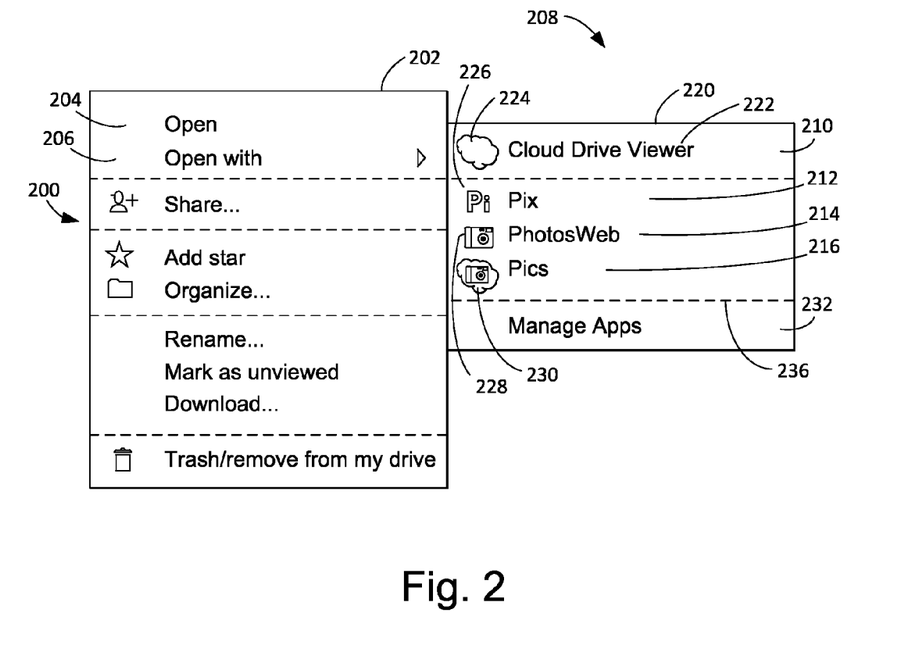
FIG. 2 is a simulated screen diagram showing a user interface employed in accordance with one or more implementations of the disclosure.

FIG. 2 shows an example user interface 200 in accordance with at least one implementation of the described techniques. To open a file in the service 100 using an installed external third-party application 114, the user 120, 121, 122 first selects the file. From a file operations dialog, such as dialog 202 of the user interface 200, the user 120, 121, 122 chooses how the user wishes to open the file, such as from an "Open" 204 or "Open with" 206 menu option. A list 208 of applicable applications 210, 212, 214, 216 capable of opening the file is then rendered in a sub-menu, auxiliary menu or sub-dialog 220 of user interface 200. An "Open with" menu option 206 may appear if one of the users 120, 121, or 122 right clicks on the Open menu option 206, or may always appear in dialog 202 along with the Open option 204.

Alternatively, the user interface 200 may display a list of clickable links or buttons appearing elsewhere in the user interface, as a result of selecting the particular file.

After such a selection of application, the selected application, e.g., 114, is then used to open the file.

Without making such a choice, by invoking some default open flow that does not first a present a list of applications to use, a default application, which may be application 116 for example, will be used to open or preview the file.

Default Application

The default application 116 may be used if, for example, the user selects the "Open" menu option 204 instead of the "Open with" option 206. A default application may or may not exist to open the file. There may be a system default application 116 built in to the system 100 (e.g., available to multiple users without the users having to install the application, and typically not a third-party application) and capable of opening files of a large number of types. In some implementations, the default application 116 is capable of opening all file types, though the richness of the resulting preview will depend on how well the default application 116 can render the file.

User Application Preference

The user 120 may wish to use the external third-party application 114 by default to open files of the specified type, instead of the system default application or instead of having to choose from a list of multiple possible applications. This preference is a default "application to file type" mapping, just for the user 120. The third-party application 114 may, for example, have become newly available and the user 120 may prefer it to the default application 116. Alternatively, the user 120 may prefer the third-party application 114 to the default application 116 because the third-party application 114 offers a richer preview or editing experience.

The user 120, 121, and 122 is able to choose which application they want to use to open all files of a particular file type (e.g. MIME type) by default.

In one specific example, a left-click (default open) on the Open menu choice 204 will invoke the specified application. In some implementations, left-clicking a file both selects the file and invokes the default open action, without a need to select an "Open" option. There is no need to right-click Open menu choice 204 to access the "Open with" submenu 220. However, a right-click and "Open with" menu selection 206 can still be used to override the default setting and select a different application.

For example, consider when the user 120 has installed two separate photo editor applications, 116 and 114. They choose to associate application 116 by default with JPEG images. When the user selects a JPEG image, it is opened with application 116 per their preference. But the user can right-click that same file and open with application 114 or otherwise override their default selection.

In one specific example, a default user application preference is indicated in submenu 220, such as at location 222 for application 210, except when the system default application or viewer is being used to open a file. The name of the application will appear next to the Open item in dialog 202 as in, "Open with" then the application name. If the default is the system default, the dialog simply says "Open."

The user application preference may be stored in the service 100 in, for example, a user-specific record in user data storage 130. The preference is used by the service 100, or the client device 124, 125, 126, when the view of the file management system is rendered for the user by the user environment manager 128. An association is made by the service 100 between application and file type, resulting in a mapping between type of the file (e.g., MIME type) and preferred application. If there is no entry for a file type or MIME type, the system default application or viewer is used, in some implementations.

When one of the users 120, 121, or 122 uses the service 100, the preference can be transferred from the system 100 to the user client machine 124, 125, or 126 and stored locally in, for example, a cached data structure inside the application or inside a web browser or other interface. Such a default preference is considered, or referenced at a time when a user expresses an interest in opening a file on server 100, to determine if any default preference has been previously set or expressed by the user. The result of such a default preference examination will determine what application is used to open the specified file.

Icons

In some examples, respective applications 210, 212, 214, and 216 have icons 224, 226, 228, and 230 associated with them and shown next to them.

Manage Apps

A "Manage apps" menu option 232 may appear in the "Open with" submenu or in a separate settings menu. One or more menu item separators 236 may be included, if desired. In some examples, this menu item appears only if a default "Open with" is enabled.

Figure 3:
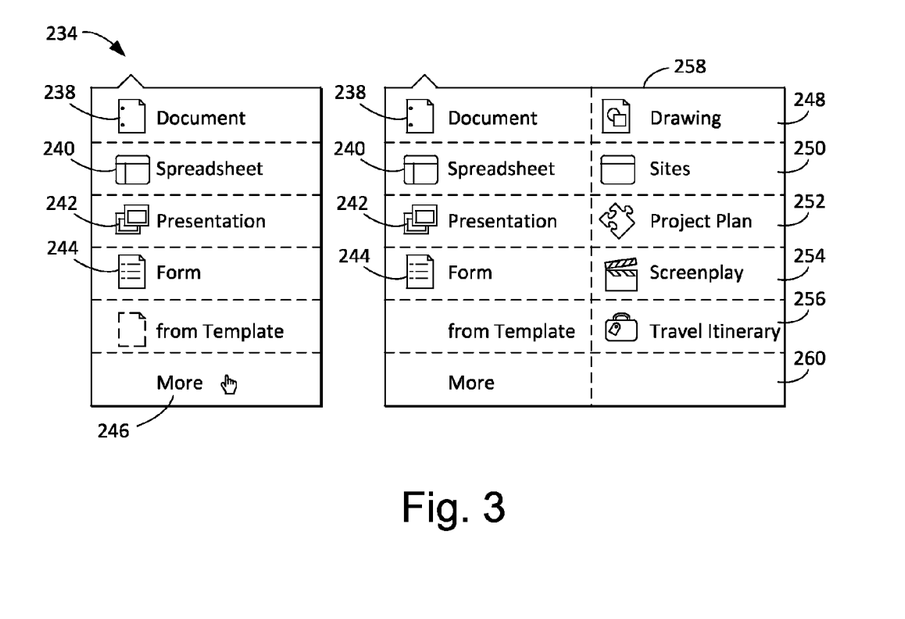
FIG. 3 is a simulated screen diagram showing a user interface employed, at a different stage than shown in FIG. 2, in accordance with one or more implementations of the disclosure.

FIG. 3 shows a variation of user interface 200 in accordance with at least one implementation of the described techniques. When the "Manage apps" menu option 232 is clicked or actuated, a "Manage apps" dialog 234 is launched. With the dialog 234, the user 120, 121, 122 is able to specify a default "Open with" mapping.

In some examples, one of the users may elect, using the Manage apps dialog, or some other dialog (not shown), to use an application by default to open files that it is capable of opening. The actual text shown on the dialog could be much simpler, "Use by default," for example. This text may appear, for example, after an application 238, 240, 242, or 244 is selected, for example.

The dialog 234 also includes a "more" menu option 246 which, when clicked or actuated, causes additional applications 248, 250, 252, 254, and 256 to be revealed, alongside applications 238, 240, 242, and 244 on a dialog 258. Any of these applications could be selected as a default application. A menu option 260 can be provided on dialog 258 which, when clicked on or actuated, results in even more applications being revealed.

Resolving Default Open Conflicts

Some examples use a simple list of application IDs that the user wants to use "by default". A scenario that requires special attention is the case of overlapping file types or MIME types: two applications can be chosen by the user as "default" for the same file type or MIME type. For example, applications Photo and Pix could both be checked as default and be "in contention" for images, e.g., those files with MIME type "image/jpeg".

Only one application can win in this case. Rather than making an alphabetical, or arbitrary decision, the service maintains an ordered list of default app IDs, and the last one appearing in the list wins. In the user interface of FIGS. 2-3, the order in which the user 120, 121, or 122 selects default applications indicates the order that applications appear in the list. Therefore, a user can "bump" an application to the top of the list by selecting and un-selecting it.

Alternatively, this list could be maintained as a queue, in which a "move to top" operation exists, or could be a completely orderable list.

Use Case

Assume that the user 120 uploads an image file 160 (see FIG. 1) of type JPEG to the service 100. The user 120 can use the built-in viewer or previewer application 210 (see FIG. 2) to render or view the image in a view-only context, but cannot edit it. The user 120 wishes to have enhanced functionality allowing editing of images. The user searches for, discovers, and later installs (or adds) two such photo applications 212, and 214. At this point, neither application 212 nor 214 has been set as default, so, in some implementations, application 212 or 214 is only accessible through "Open with." The photo applications 212 and 214 are both capable of editing files of MIME type JPEG. Instead of using the default viewer application 210, the user 120 now instead wishes to use one of the applications 212 or 214 to open the JPEG photo file 160. The user selects the file 160, and then is presented on their computing device 124, by user environment manager 128, with a list of applications that can open files of the type of the selected file, namely, JPEG. The list includes both the built-in system default viewer application 210, and both recently installed applications 212 and 214 capable of opening files of type JPEG (see FIG. 2). The list indicates which application in the list is currently the default, via some visual mechanism, including text, bolding, a checkmark, or order in the list. For example, the default application may appear at the top of the list. The user selects which application in the list they wish to use. They select the first recently installed application 212. The image is opened with the application 212.

The user 120 now wishes to try the second application 214. They repeat the flow, this time choosing the second recently installed application 214. The second application 214 is now used to open the JPEG photo. Satisfied with the second application 214, the user 120 wishes to always use the second recently installed application 214 by default to open files of type JPEG. They do not wish to be prompted. The user 120 sets this preference according to some user interface component, such as a Manage Apps dialog, and the preference is recorded in the service 100, such as in user preference store 142. Later, the user 120 wishes to open a second JPEG photo 162, different from the first photo 160. They invoke the default open process. They are not prompted with a list of applications that can open the file, as before. Because they have set a default open preference, there is a mapping of JPEG type to the application 214. The application 214 is therefore automatically used to open the JPEG photo, 162 because the previously stored preference was referenced dynamically. The user realizes that for one special purpose, on a one-off basis, they wish to open the file 162 in application 212. Yet they do not wish to disrupt their previously specified default preference more generally. They can therefore choose to be prompted with a list of applicable applications capable of opening the photo, on a one-off basis (e.g., by right clicking on the file entry in a documents list or by right clicking "Open" menu option 204). In this one instance, they choose to use the first installed application 212, and the file 162 opens accordingly in application 212.

The user 120 later uninstalls the application 212. Later, the user wishes to go through the non-default open flow for a JPEG photo, and be prompted with a list of all applicable installed applications 210 and 214, but the list will not contain the first installed application 212 that has been uninstalled. When an application is uninstalled that is the current default preference, the default preference will revert to a previously registered default application (that may have been default but was overwritten). If there is no such application, the default preference will revert to the system default application 210 capable of previewing all files.

Figure 4:
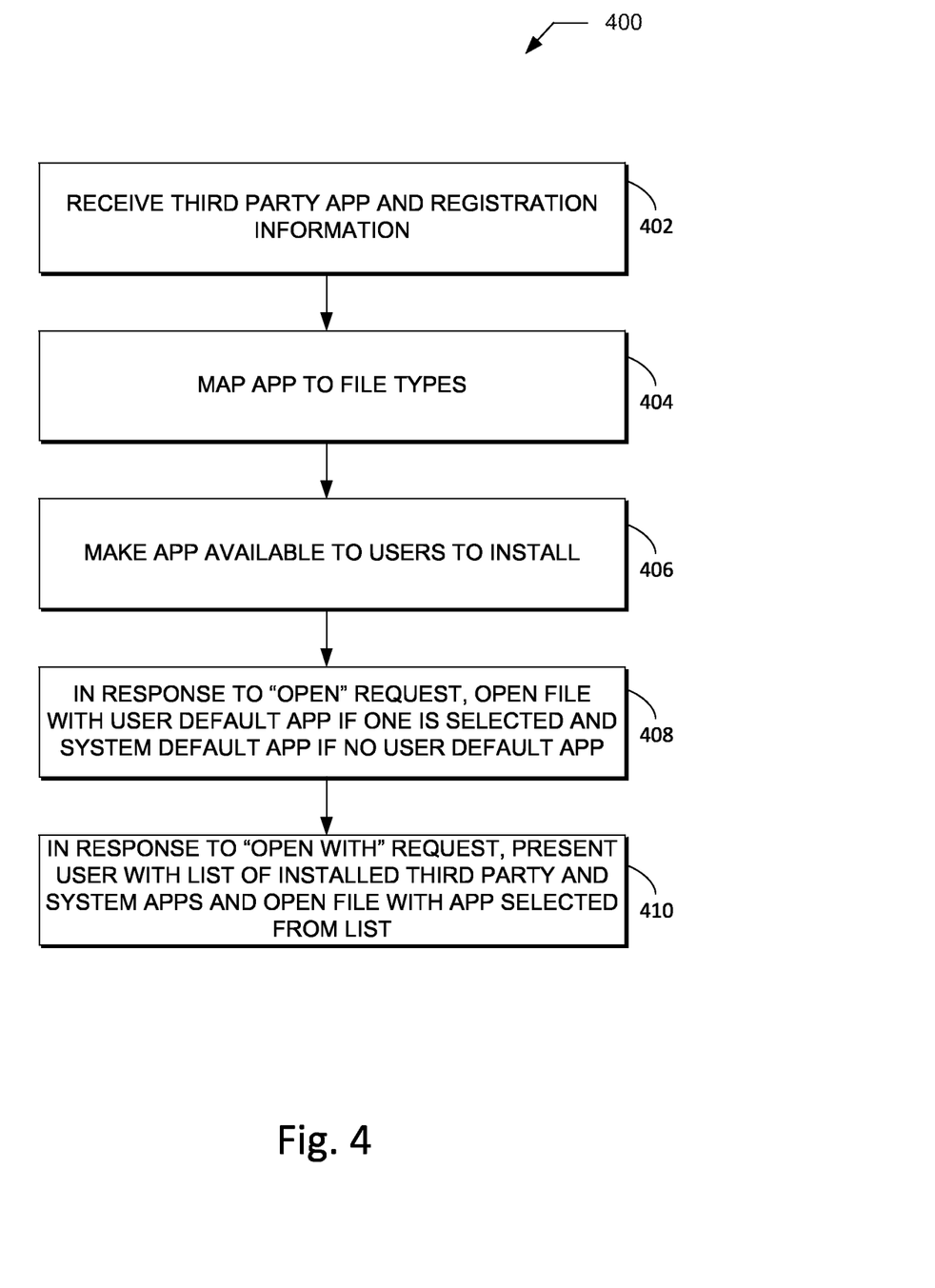
FIG. 4 is a flow chart of techniques employed in accordance with one or more implementations of the disclosure.

FIG. 4 shows an example workflow 400 in accordance with more generalized implementations. In 402, the service 100 receives a third-party application and registration information. In 404, the service 100 maps the third-party application to file types that the application can open (e.g., MIME types or other file types), where file type data is stored in the files themselves (e.g., in a header or in metadata). In 406, the service 100 makes the application available to users to install (e.g., to see in their "Open with" lists). In 408, in response to an "Open" request, the service 100 (using an application provided by the service 100), opens a file with a user default application if a user default application has been selected or set by a user, and uses a system default application if no user default application has been selected or set by a user. In 410, in response to an "Open with" request, the service 100 presents a user with a list of installed third-party and system applications and opens a file with an application that the user selects from the list.

Figure 5:
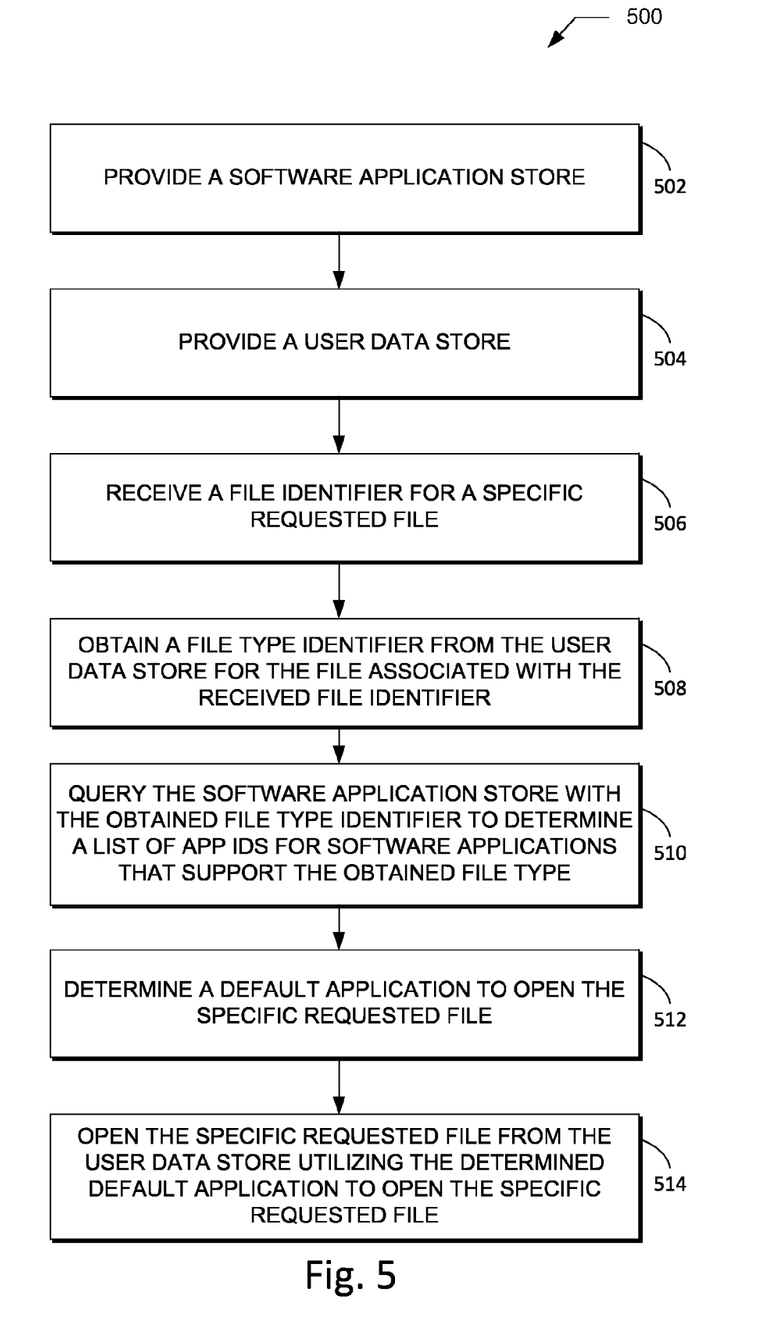
FIG. 5 is a flow chart of techniques employed in accordance with one or more implementations of the disclosure.

FIG. 5 shows a sample workflow 500 in accordance with more generalized implementations. In 502, a software application store is provided including software application descriptions, each software application description having app ID, application title, and supported Multipurpose Internet Mail Extensions (MIME) types or file types. The term "software application descriptions," as used herein, is not to be confused with a metadata field called "description." The software application descriptions are associated with either the provider of the service 100 or a third-party developer.

In 504, a user data store is provided including files associated with users, respective files within the user data store 130 having a file identifier, a MIME-type identifier (or file type identifier), and data which is binary encoded in accordance with a MIME-type (or file type).

The user data store includes a list of app IDs identifying user installed software applications from the software application store. The user data store 130 further includes file access user preferences specifying default applications to open files, including app IDs of particular user installed software applications.

In 506, a file identifier is received for a specific requested file at the service 100 over the communication network from a user 120, 121, or 122 operating a computing device 124, 125, or 126.

In 508, a file type identifier is obtained from the user data store 130 for the file associated with the received file identifier.

In 510, the software application store is queried with the obtained MIME-type (or file type) identifier to determine a list of app IDs for software applications that support the obtained MIME type (or file type).

In 512, a default application to open the specific requested file is determined in response to matching an app ID contained in the file access user preferences with the selected list of app IDs for software applications that support the MIME type (or file type).

In 514, the specific requested file is obtained from the user data store 130 utilizing the determined default application to open the specific requested file.

Other Alternatives

In some implementations, file extension information is used instead of a MIME type or file type to indicate the type of files a third-party application can open. An extension and MIME type are both stored as metadata on a file generated by a third-party application. In some implementations, both file extension type and MIME type are used. This is because some files do not have their MIME type set for various reasons, but have a valid extension that indicates file type. Alternatively, some files may have their file extension removed by the user, but the service 100 still knows what to do with them because MIME type information is present and can be used.

Third-party developers, just as they register a list of MIME types, also register a list of extensions.

In some implementations, both flows are executed independently, and the resulting "Open with" lists are reconciled by unioning together the two lists and removing duplications for the "Open with" list displayed to the user. By "unioning," what is meant is taking a union set, in other words, a combination of lists, with duplicates removed.

Default "Open with" can be set on either a MIME type or an extension basis.

In other implementations, the service 100 provides a partial "Open with" functionality, always prompting the user, without exposing a specific mechanism to allow the user to express a default "Open with" preference.

Example Implementation

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 6:
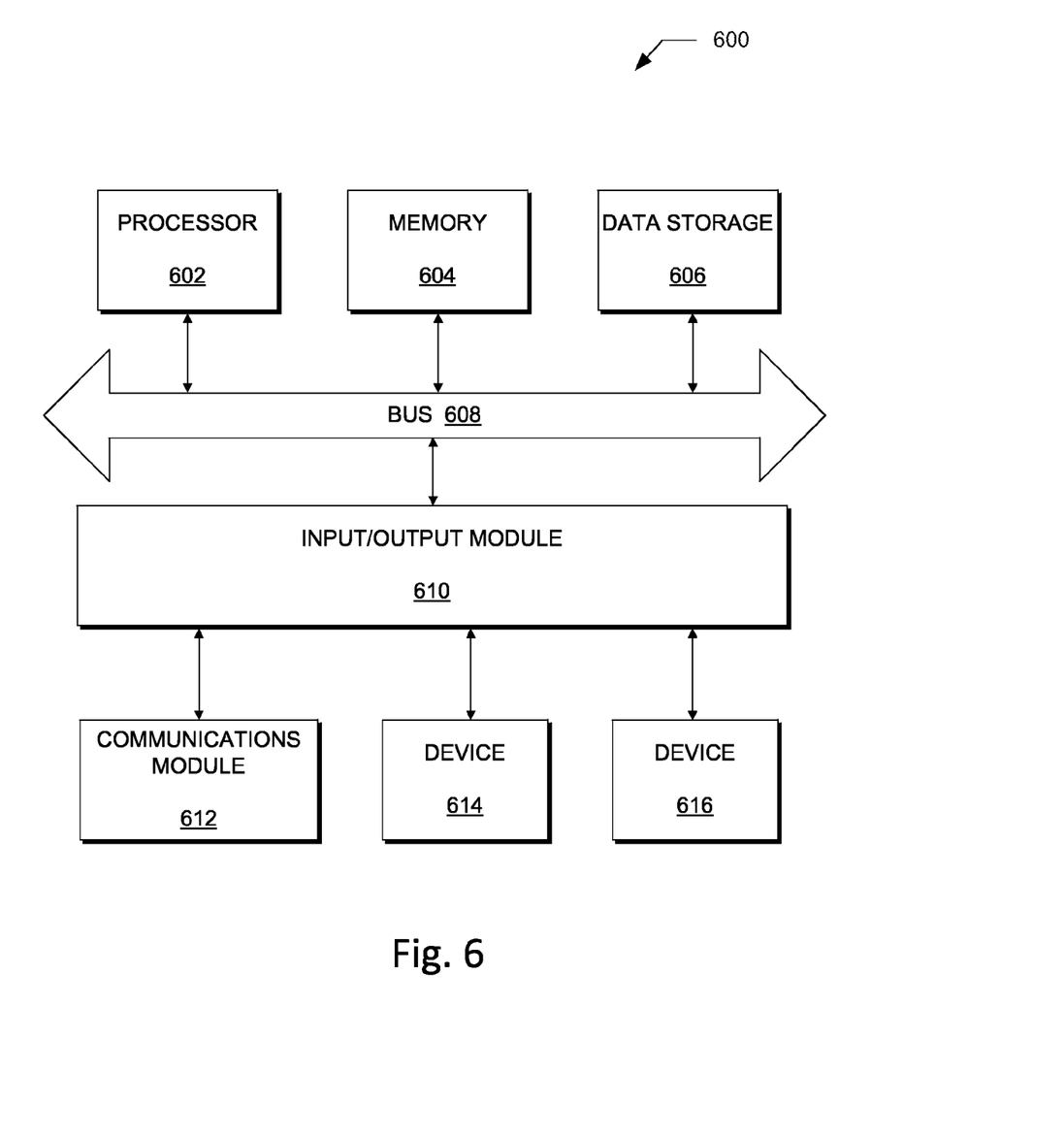
FIG. 6 is a schematic diagram of an exemplary computer system employed in accordance with one or more implementations of the disclosure.

FIG. 6 is a block diagram illustrating an exemplary computer system 600 with which the system for associating a file type with an application of FIGS. 1-2 can be implemented. In certain aspects, the computer system 600 may be implemented using hardware or a combination of software and hardware, either in a dedicated server, or integrated into another entity, or distributed across multiple entities.

Computer system 600 includes a bus 608 or other communication mechanism for communicating information, and a processor 602 coupled with bus 608 for processing information. By way of example, the computer system 600 may be implemented with one or more processors 602.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 604 and implemented in one or more computer program products, i.e., one or more modules of computer program instructions encoded on a computer readable medium for execution by, or to control the operation of, the service 100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via an input/output module 610 to various devices. The input/output module 610 can be any input/output module. Example input/output modules 610 include data ports such as USB ports. The input/output module 610 is configured to connect to a communications module 612. Example communications modules 612 include networking interface cards, such as Ethernet cards and modems. In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a CRT (cathode ray tube) or LCD (liquid crystal display) monitor, for displaying information to the user.

According to one aspect of the present disclosure, the system for associating a file type with an application as shown in FIGS. 1-2, can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the processes described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, an enterprise server or group of servers, one or more desktop computers, one or more laptop computers, etc. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventors invoke 35 U.S.C. §112, paragraph 6 only when the words "means for" or "steps for" are used in the claim. If such words are not used in a claim, then the inventors do not intend for the claim to be construed to cover the corresponding structure, material, or acts described herein (and equivalents thereof) in accordance with 35 U.S.C. §112, paragraph 6.

What is claimed is:

1. A storage server operatively coupled to a communication network, the storage server comprising:
    a software application store including software application descriptions, each software application description having app ID, application title, and supported file types, the software application descriptions being associated with either the storage service provider or a third-party developer;
    a user data store, including:
    files associated with users, respective files within the user data store having a file identifier, a file type identifier, and data which is binary encoded in accordance with a file type,
    a list of app IDs identifying user installed software applications from the software application store for a user; and
    file access user preferences specifying default applications to open files, including app IDs of particular user installed software applications; and
    a processor configured to:
    receive a file identifier for a specific requested file at the storage service over the communication network from a user operating a computing device;
    obtain the file type identifier from the user data store for the file associated with the received file identifier;
    query the software application store with the obtained file type identifier to determine a list of app IDs for software applications that support the obtained file type;
    determine an application to open the specific requested file in response to matching an app ID contained in the file access user preferences with the selected list of app IDs for software applications that support the file type; and
    open the specific requested file from the user data store utilizing the determined application to open the specific requested file.

2. A storage server according to claim 1, wherein the processor is further configured to select a system default built-in application in response to the querying operation in the software application database not finding a software application.

3. A storage server according to claim 1, further comprising a user environment manager operative to receive a file creation request at the storage service over the communication network from a user operating a client device, the file creation request including a specific file type, the user environment manager also operatively configured to determine an application to create a file with the specific file type by (i) querying the software application database with the received specific file type to select client IDs of software applications with the supported file type, and (ii) selecting a software application with a client ID designated in the user selected file access preference from the user data store that matches one of the selected client IDs, the user environment manager also operatively configured to generate display information for the computing device in response to creating a file with the specific file type with the selected software application.

4. A storage server operatively coupled to a communication network, the storage server comprising:
    a software application store comprising metadata about software applications, the metadata for each software application including, application identifier (app ID), application title, application description, and supported Multipurpose Internet Mail Extensions (MIME) types, the software application being associated with either the storage service provider or a third-party developer;
    a data store comprising files associated with users, each file within the data store having a file identifier, a MIME-type identifier, and data binary encoded in accordance with a MIME-type,
    an installed applications list of app IDs identifying installed software applications from the software application store for a particular user;
    a user preferences store comprising app IDs of particular user installed software applications to be used by default to open files;
    a processor configured to:
    provide a user interface to a first user operating a computing device;
    receive a file identifier for a specific requested file at the storage service over the communication network from the computing device operated by the first user;
    obtain the MIME-type identifier from the data store for the file associated with the received file identifier;

query the software application store with the installed applications list of app IDs and the obtained MIME-type identifier to select a list of app IDs for installed software applications that support the obtained MIME-type;

determine a default application to open the specific requested file in response to matching an app ID contained in the user preferences store with the selected list of app IDs for installed software applications that support the MIME-type; and open the specific requested file from the data store utilizing the determined default application to open the specific requested file.

5. A storage server according to claim 4, wherein the processor is further configured to receive a user selection of a universal default application capable of previewing files with any MIME-type in response to the querying operation in the software application database not selecting another installed software application that supports the MIME-type.

6. A storage server according to claim 4 wherein the processor is further configured to:

receive a user selection of a particular installed application to open the specific requested file in response to:

querying the software application store with the installed applications list and the obtained MIME-type identifier to select a list of app IDs and application titles for installed software applications that support the obtained MIME type, and sending the selected list of app IDs and application titles for installed software applications that support the MIME-type over the communications network to the computing device operated by the first user so that the computing device operated by the first user can display the selected list of application titles for installed software applications to the user on a display; and providing the specific requested file from the data store to the particular installed application selected by the user.

7. A storage server service according to claim 4 wherein:

the user preferences store comprises an ordered list of app IDs of particular user installed software applications to be used by default to open files, and the processor is further configured to determine a default application to open the specific requested file in response to:

(i) obtaining an ordered list of app IDs contained in the user preferences store which match with the selected list of app IDs for installed software applications that support the MIME type and (ii) selecting a last app ID in the obtained ordered list of at least two app IDs as the determined default application to open the specific requested file.

8. A storage server according to claim 4, wherein:

the user preferences store comprises a mapping of each particular MIME-type to one app ID of a user installed software application to be used by default to open files of that particular MIME-type, and the processor is further configured to determine the default application to open the specific requested file in response to querying the user preferences store mapping of MIME-types to app IDs with the obtained MIME-type identifier to select the one app ID of a user installed software application to be used by default to open files of that particular MIME-type.

9. A storage server according to claim 4 wherein the processor is further configured to:

receive a file creation request at the storage service over the communication network from the user operating the computing device, the file creation request including a specific MIME-type, determine an application to create a file with the specific MIME-type by querying the software application store with the installed applications list and the received specific MIME-type to select an app ID for an installed software application that supports the received specific MIME-type, and create a file in the data store associated with the user utilizing the determined application to create a file with the specific MIME-type.

10. A storage server according to claim 9 wherein the processor is further configured to:

request a selection of a particular installed application to create a file with the specific MIME-type in response to a query to the software application store with the installed applications list and the received specific MIME-type resulting in a list of more than one app ID for installed software applications that support the received specific MIME-type, query the software application store with the installed applications list and the received specific MIME-type to select a list of app IDs and application titles for installed software applications that support the received specific MIME type, and send the list of app IDs and application titles for installed software applications that support the received specific MIME-type over the communications network to the computing device operated by the user so that the computing device can display the list of app titles for installed software applications to the user on a display.

11. A storage server according to claim 9 wherein the processor is further to create a file in the data store associated with the user utilizing the user-selected particular installed application to create a file with the specific MIME-type.

12. A method that facilitates opening, with a default software application, a specific requested file stored by a storage service operating on one or more servers, the method comprising:

receiving a file identifier for the specific requested file at the storage service over a communication network from a computing device operated by a particular user;

obtaining a MIME-type identifier from a data store hosted by the storage service for the specific requested file associated with the received file identifier;

obtaining an installed applications list of application identifiers (app IDs) from an installed applications store hosted by the storage service, the installed applications list identifying software applications for the particular user which are installed in a web-based user storage environment hosted by the storage service for the particular user;

querying a software application store with the installed applications list and the obtained MIME-type identifier to select a list of app IDs for installed software applications that support the obtained MIME-type, the software application store comprising metadata about software applications, the metadata for each software application including, app ID, application title, application description, and supported Multipurpose Internet Mail Extensions (MIME) types, the software application being associated with either the storage service provider or a third-party developer;

determining a default application to open the specific requested file in response to matching an app ID from a user preferences store hosted by the storage service containing app IDs of particular user installed software applications to be used by default to open files with the selected list of app IDs for installed software applications that support the MIME-type; and opening the specific requested file from the data store utilizing the determined default application to open the specific requested file in the web-based user storage environment hosted by the storage service for the particular user.

13. A non-transitory computer-readable storage media storing instructions that, when executed by a computer server, causes the computer server to perform operations that facilitate opening, with a default software application, a specific requested file stored by a storage service operating on the server, the operations comprising:

receiving a file identifier for the specific requested file at the storage service over a communication network from a computing device operated by a particular user;

obtaining a file type identifier from a data store hosted by the storage service for the specific requested file associated with the received file identifier;

obtaining an installed applications list of application identifiers (app IDs) from an installed applications store hosted by the storage service, the installed applications list identifying software applications for the particular user which are installed in a web-based user storage environment hosted by the storage service for the particular user;

querying a software application store with the installed applications list and the obtained file type identifier to select a list of app IDs for installed software applications that support the obtained file type, the software application store comprising metadata about software applications, the metadata for each software application including, app ID, application title, application description, and supported file types, the software application being associated with either the storage service provider or a third-party developer;

provide to a user a list of applications capable of opening the specific requested file; and opening the specific requested file from the data store utilizing the user-selected application.

14. A non-transitory computer-readable storage media according to claim 13 wherein the file type is a MIME type.

* * * * *